E. J. PAGE.
BEET HARVESTER.
APPLICATION FILED AUG. 14, 1917.
1,297,231.
Patented Mar. 11, 1919.
3 SHEETS—SHEET 3.
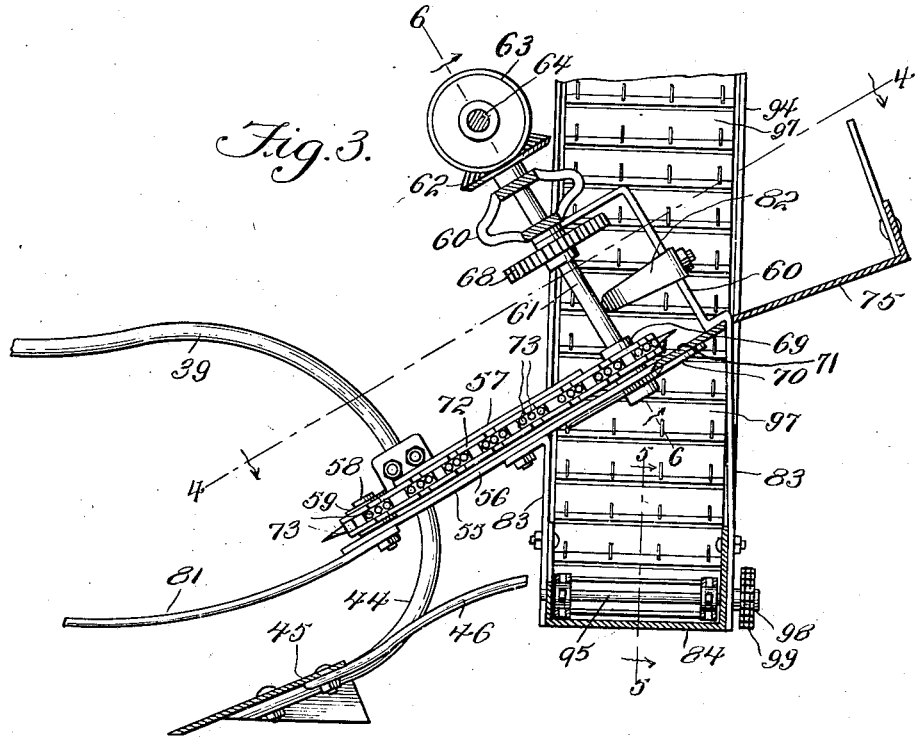
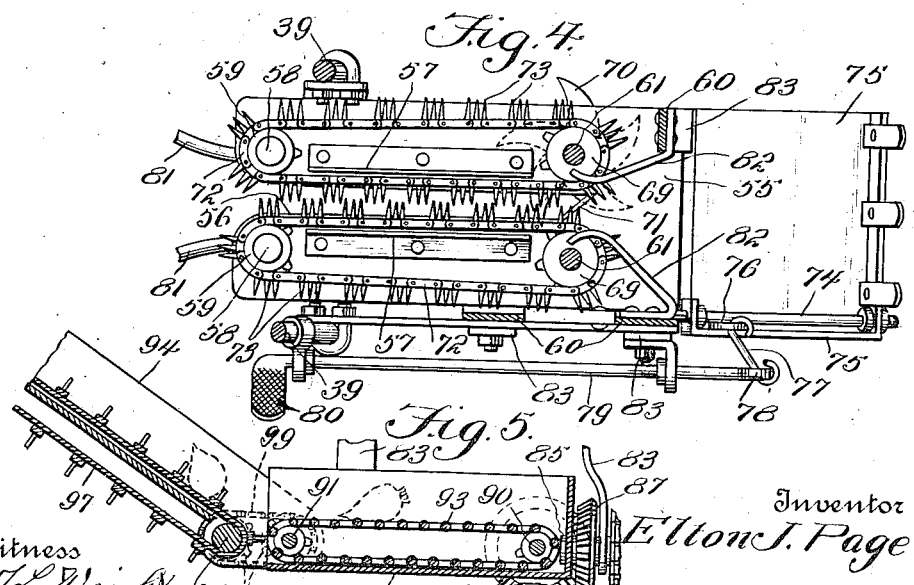
Inventor
Elton J. Page
Witness
By Victor J. Evans
Attorney

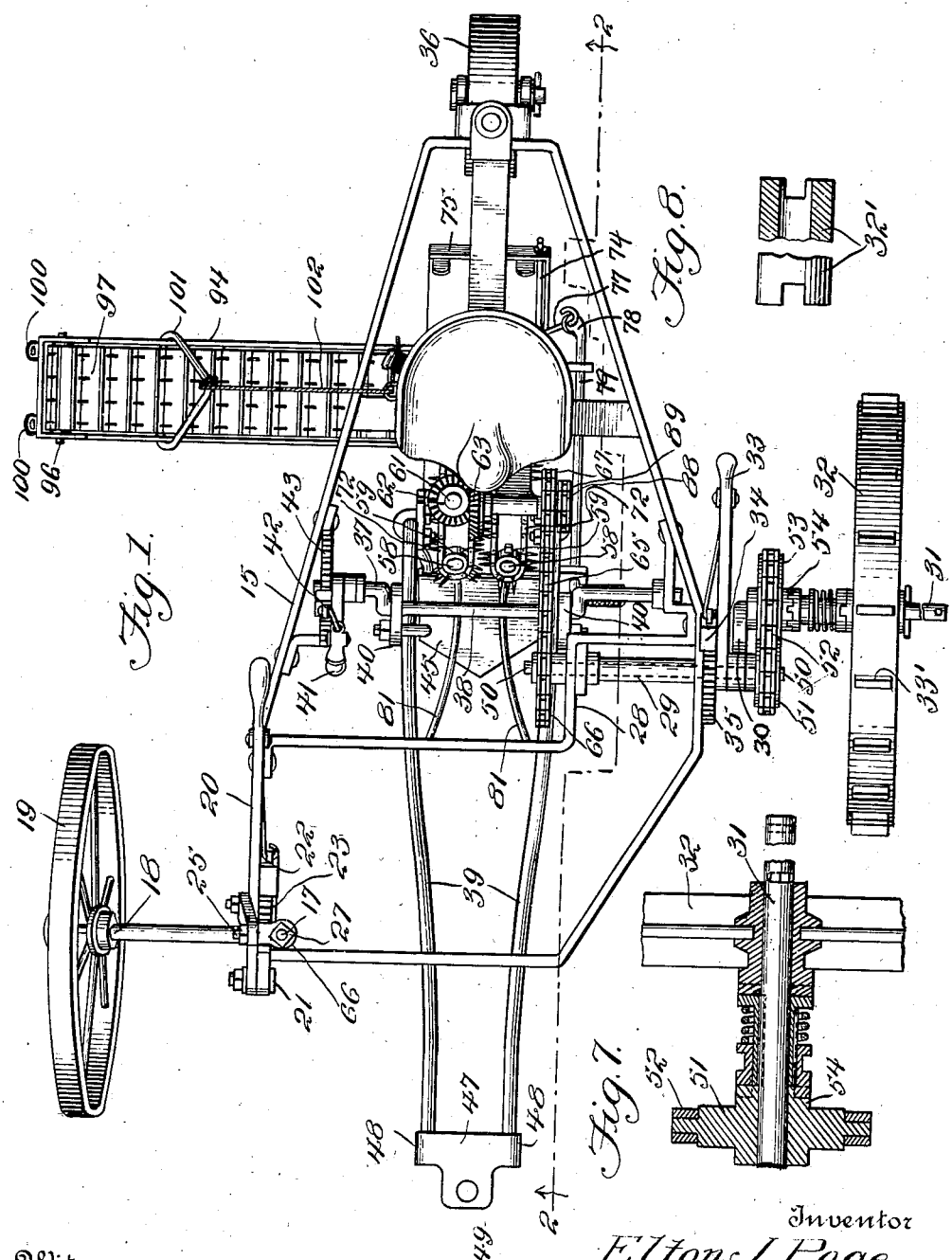

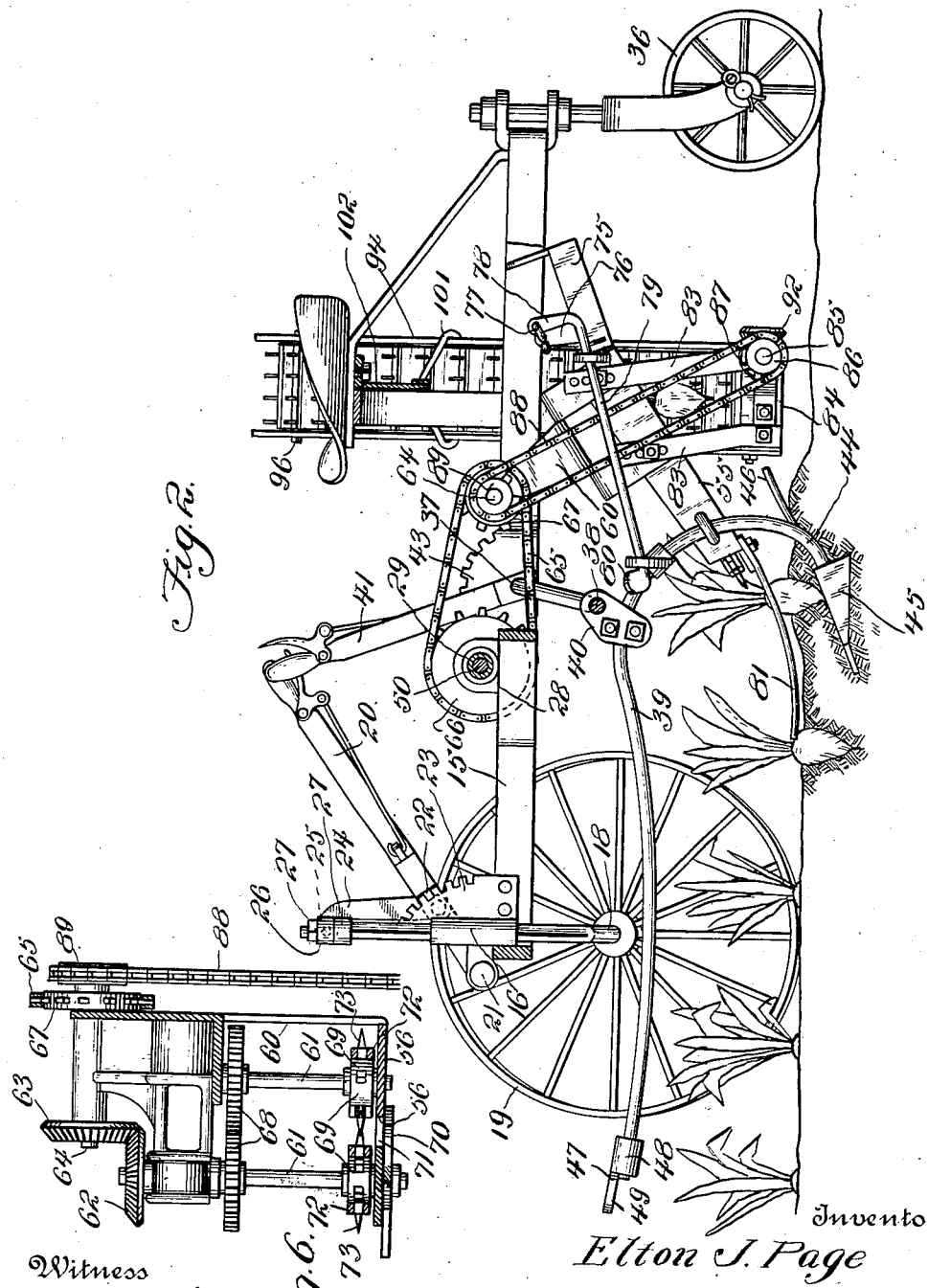

UNITED STATES PATENT OFFICE.

ELTON J. PAGE, OF FRANKLIN, NEBRASKA.

BEET-HARVESTER.

1,297,231.  Specification of Letters Patent.  Patented Mar. 11, 1919.

Application filed August 14, 1917. Serial No. 186,173.

*To all whom it may concern:*

Be it known that I, ELTON J. PAGE, a citizen of the United States, residing at Franklin, in the county of Franklin and State of Nebraska, have invented new and useful Improvements in Beet-Harvesters, of which the following is a specification.

This invention relates to beet harvesters and it has for its object to produce an organized machine of simple and improved construction for digging or excavating beet roots from the ground, cutting the tops from the same, discharging the tops in piles on the ground, to enable them to be conveniently gathered, and for discharging the beet roots into a receptacle such as the box of a wagon which may move alongside the harvester.

A further object of the invention is to simplify and improve the conveyer whereby the beets are carried to the topping apparatus, as well as the construction whereby the beet roots are permitted to drop directly upon the elevating conveyer when severed from the tops, while the tops or leaves will be separately discharged into a tiltable receptacle from which they will be subsequently dumped on the ground.

Further objects of the invention are to simplify and improve the detailed construction and arrangement of the parts entering into the construction of the machine.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Figure 1 is a top plan view of a machine constructed in accordance with the invention.

Fig. 2 is a longitudinal sectional view taken on the line 2—2 in Fig. 1.

Fig. 3 is a side elevation partly in section.

Fig. 4 is a sectional view taken on the line 4—4 in Fig. 3.

Fig. 5 is a sectional detail view taken on the line 5—5 in Fig. 3.

Fig. 6 is a sectional detail view taken on the line 6—6 in Fig. 3.

Fig. 7 is a sectional detail view of the clutch used in connection with the bull wheel and related parts.

Fig. 8 is a detail view partly in section of the spacing sleeve 32' sometimes used in connection with the machine.

Corresponding parts in the several figures are denoted by like characters of reference.

The frame 15 of the improved machine is provided at its forward end, at the discharge side of the machine, with a vertical sleeve 16 in which is fitted a vertically adjustable shaft 17 carrying at its lower end a spindle 18 on which one of the ground wheels 19 is supported for rotation. For the purpose of effecting vertical adjustment of the shaft 17 a hand lever 20 is provided, said lever being fulcrumed at 21 and provided with a stop member 22 engaging a segment rack 23. Said lever is connected by means of a link 24 with a pin 25 extending radially from a collar 26 which is fitted on the shaft 17 between stop members 27. It is evident that by proper manipulation of the lever, the shaft carrying the wheel 19 may be adjusted vertically with relation to the frame, the forward portion of which may thus be raised or lowered relatively to the ground. At the opposite side of the frame is provided a horizontal bearing 28 for a shaft 29 having a crank 30 provided with a spindle 31 on which the opposite ground wheel 32 is supported for rotation. The spindle 31 on the ground wheel 32 is mounted whereby it may be equipped with a spacing sleeve such as indicated at 32' in order that the width of the machine may be regulated according to the distance between the rows of plants. It is also evident that the said wheel 32 may be provided with lugs or grouts as indicated at 33' to engage the ground to prevent slipping. Securely connected with the shaft 29 and extending radially with respect thereto is a hand lever 33 having a stop member 34 engaging a rack segment 35. It will be seen that by proper manipulation of the hand lever 33 the shaft 29 may be rotated about its axis, thereby raising or lowering the wheel 32 relatively to the frame and thus effecting adjustment of this side of the frame relatively to the ground. The rearward end of the frame is supported on a trailer or caster wheel 36.

Supported in suitable bearings on the frame 15 is a transversely disposed shaft 37 having intermediate the ends thereof a crank 38 with which the beams 39 are connected by means of clips 40 having pivotal engagement with the crank 38. The crank shaft 37 is provided with a lever 41 whereby it may be turned or adjusted about its axis, said lever being provided with a stop member or locking device 42 engaging a rack segment 43 whereby the said crank shaft will be securely retained at various adjustments. The beams 39 are curved downwardly at their rearward ends to produce standards 44 on which is mounted a digger 45 having rearwardly extending fingers 46 over which the beets excavated by the digger will be guided in an upward and rearward direction. The forward ends of the beams 39 are spaced apart and connected together by a plate 47 having terminal sleeves 48 in which the forward ends of the beams are secured, said plate being also provided with a forwardly extending lug 49 constituting a draft attachment to which the draft animals may be hitched in any convenient well known manner.

The shaft 29 is of tubular form and it affords a bearing for an interior shaft 50 carrying at one end a sprocket wheel 51 which is connected by a chain 52 with a sprocket wheel 53 which is mounted for rotation on the spindle 31 and which is adapted to be operatively connected with the ground wheel 32 by means of a clutch device conventionally indicated at 54, it being understood that a lever of well known form may be provided for the purpose of actuating said clutch device to place the sprocket wheel 53 in or out of gear with respect to the ground wheel 32. By this device the shaft 50 may be driven when the machine is in operation for the purpose of transmitting motion from the ground wheel 32 to various parts of the machine that are to be driven, as will be presently described.

Supported on and securely connected with the beams 39 at the rearward ends thereof is a rearwardly extending platform 55 having a longitudinal slot 56 that extends from the front edge thereof in a rearward direction. Guide flanges 57 are secured on the platform in spaced relation to the side walls of the slot 56. The platform 55 is provided near its forward edge with vertically disposed stub shafts 58 on which idle sprockets 59 are supported for rotation. The platform 55 is provided with upwardly extending brackets 60 which together with the platform afford bearings for a pair of vertically disposed shafts 61, one of which carries a beveled gear 62 meshing with a beveled gear 63 on a horizontally disposed shaft 64 which receives motion from the shaft 50 by a transmission chain 65 which is trained over sprocket wheels 66, 67 on the shafts 50 and 64 respectively. The shafts 61 are provided with intermeshing gears 68 whereby, when the machine is in operation, the said shafts will be rotated in opposite directions. Each of the shafts 61 carries directly above the platform 55 a sprocket wheel 69, said sprocket wheels being disposed in the plane of the idle sprockets 59. One of the shafts 61 carries directly below the platform 55 a star wheel 70 which coöperates with a ledger plate 71 at the rearward end of the slot 56 to effect a cutting action.

Trained over the sprocket wheels 69 and the idlers 59 are conveyer chains 72, on every other link, each of which is provided with teeth 73, the toothed links being arranged in alternate order on the two chains so that on the inner or opposed flights of the two chains the toothed links of one chain will be opposed to the untoothed links of the other chain. A construction is thus provided whereby material guided between the chains will be thereby carried in a rearward direction to be acted upon by the cutting apparatus. Supported on a shaft 74 which extends rearwardly from the platform 55 is a rocking or tiltable receptacle 75 having an upwardly extending arm 76 which is connected by a link 77 with a crank or arm 78 on a rock shaft 79 having at its forward end a treadle 80, whereby it may be controlled to maintain the receptacle 75 in position to receive the tops or leaves that are detached from the beets by the cutting apparatus. When the pressure of the driver's foot is removed from the treadle 80, the receptacle 75 will gravitationally swing to a discharge position. It is obvious that a locking device may be used for the purpose of maintaining the receptacle 75 in receiving position, but such devices being common and well understood, it is not deemed necessary to particularly describe or illustrate any such device.

The platform 55 is provided at its forward end with forwardly and downwardly extending divergent gathering arms 81 between which the tops or leaves of the beets will be received and whereby said tops or leaves will be guided in engagement with the conveyer chains 72, to be thereby carried rearwardly with respect to the platform and into engagement with the cutting apparatus whereby the tops will be severed and passed on to the receptacle 75 while the beet roots will be permitted to drop to be disposed of as will be presently described.

The platform brackets 60 are provided with forwardly extending deflecting arms 82 which serve to disengage the beet tops from the conveyer chains and to guide the same in a rearward direction to the receptacle 75.

The platform 55 is provided near its rearward end with downwardly extending arms or hangers 83 supporting a frame 84 having at one side a stub shaft 85, said stub shaft being revolubly mounted in the frame 84 and in one of the hangers 83. Fixed on said revoluble stub shaft is a sprocket wheel 86 and a beveled gear 87, the sprocket wheel 86 being connected by a chain 88 with a sprocket wheel 89 on the driven shaft 64. Supported for rotation in the frame 84 are shafts 90, 91, one of which, 90, is provided with a beveled gear 92 meshing with the beveled gear 87 from which it derives motion. A conveyer 93 is trained over the shafts 90, 91. Swingingly supported on the shaft 91 is an elevator frame 94 provided near its lower and upper ends with shafts 95, 96 over which an elevating conveyer 97 of suitable construction is trained. The shafts 95 and 91 are provided with sprockets 98 over which is trained a transmission chain 99 whereby motion is transmitted from the conveyer 93 to the elevating conveyer 97. The elevator frame 94 is provided near its outer end with longitudinally disposed anti-friction rollers 100 which may be permitted to rest on the edge of the box of a wagon that moves alongside of the machine. The elevator frame, however, has also been shown as being provided near its outer end with a yoke 101 which may be connected with one end of an adjusting rope 102 whereby the elevator frame may be suspended in adjusted position.

In the operation of this machine it will be seen that the frame structure may be raised or lowered by proper manipulation of the hand levers 20 and 33 whereby adjustment of the frame relatively to the ground wheels 19 and 32 is effected. By manipulation of the hand lever 41 the crank shaft 37 carrying the digging apparatus and related parts may also be adjusted for the purpose of causing the digger to engage the ground at the requisite depth to engage and to lift the beets. When the beets are lifted by the digger the tops or leaves will be engaged by the gathering arms 81 until they pass between the toothed conveyer chains 72 whereby they are carried into engagement with the cutting apparatus. The tops having been severed, the beets will drop on the conveyer 93 from which they pass to the elevating conveyer 97 whereby they are carried to the point of discharge. The tops or leaves will be disengaged from the conveyer chains 72 by the deflectors 82 and will pass to the receptacle 75 from which they may be discharged on the ground in piles of convenient size for subsequent gathering.

It will be understood that in the construction of this machine, clutch devices for interrupting motion, chain tightening devices and other instrumentalities of well known character may be employed wherever needed for the purpose of promoting and insuring the successful operation of the machine as an entirety.

What is claimed, is:—

1. A wheeled carrying frame, a pair of digger carrying beams, a platform connected with and extending rearwardly from the beams, said platform having a longitudinal slot extending rearwardly from the front edge thereof, idle sprockets supported at the front end of the platform adjacent to the sides of the slot, vertical shafts supported on the platform adjacent to the rear end of the slot, said shafts having intermeshing gears, means for driving one of said shafts, a star wheel on one of said shafts below the platform, a ledger plate at the rear end of the slot coöperating with the star wheel to form a cutting apparatus, sprocket wheels on the vertical shafts and chains trained over said sprocket wheels and over the side sprockets at the front end of the platform.

2. A wheeled carrying frame, a pair of digger carrying beams, a platform connected with and extending rearwardly from the beams, said platform having a longitudinal slot extending rearwardly from the front edge thereof, idle sprockets supported at the front end of the platform adjacent to the sides of the slot, vertical shafts supported on the platform adjacent to the rear end of the slot, said shafts having intermeshing gears, means for driving one of said shafts, a star wheel on one of said shafts below the platform, a ledger plate at the rear end of the slot coöperating with the star wheel to form a cutting apparatus, sprocket wheels on the vertical shafts and chains trained over said sprocket wheels and over the side sprockets at the front end of the platform, each of said chains having alternate toothed links, the teeth of which extend in the direction of the untoothed links on the opposed flight of the other chain.

In testimony whereof I affix my signature.

ELTON J. PAGE.